US012802010B2

(12) United States Patent
Jain et al.

(10) Patent No.: US 12,802,010 B2
(45) Date of Patent: Nov. 17, 2026

(54) ENVIRONMENT STABILITY ASSESSMENT SYSTEM

(71) Applicant: Truist Bank, Charlotte, NC (US)

(72) Inventors: Nishank Jain, Atlanta, GA (US); Sweta Sharan, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 12 days.

(21) Appl. No.: 18/932,928

(22) Filed: Oct. 31, 2024

(65) Prior Publication Data

US 2026/0120027 A1 Apr. 30, 2026

(51) Int. Cl.
*G06Q 10/0633* (2023.01)

(52) U.S. Cl.
CPC ................................ *G06Q 10/0633* (2013.01)

(58) Field of Classification Search
CPC .................................................. G06Q 10/0633
See application file for complete search history.

(56) References Cited

U.S. PATENT DOCUMENTS

2013/0297972 A1* 11/2013 Yokote ................ G06F 11/3051 714/15
2019/0327271 A1* 10/2019 Saxena ................... H04L 41/16
2020/0177616 A1* 6/2020 Hadar ................. H04L 63/1433
2024/0179158 A1* 5/2024 Kommula ................ G06N 5/01
2024/0320586 A1* 9/2024 Yashchin ........... G06Q 10/0635
2024/0362130 A1* 10/2024 Berg ...................... G06F 11/327
2025/0028518 A1* 1/2025 Portisch .................... G06F 8/65
2025/0117485 A1* 4/2025 Sundar .................. G06F 21/566
2026/0003969 A1* 1/2026 Ros ....................... G06F 21/577
2026/0010853 A1* 1/2026 Komavec Osojnik ....................... G06Q 10/0635

* cited by examiner

*Primary Examiner* — Deirdre D Hatcher
(74) *Attorney, Agent, or Firm* — Nicholas Martin; Greenberg Traurig, LLP; Michael A. Springs

(57) ABSTRACT

The disclosed technology includes generating, based on a configuration file, a dependency graph representing a production environment. The dependency graph may contain nodes and edges. The structure of the dependency graph is based on relationships identified between the applications of the production environment. Historical incident data that includes historical data related to past production environment disruptions may be obtained, parsed, and used to generate weights for the nodes or edges of the dependency graph. The generated weights may be assigned to the dependency graph. A potential update to the production environment may be obtained. An impact score for the potential update may be generated by utilizing the weights of the dependency graph. An alert may be transmitted to a computing device when the impact score is above a threshold value.

13 Claims, 3 Drawing Sheets

ENVIRONMENT STABILITY ASSESSMENT SYSTEM

TECHNICAL FIELD

The present disclosure relates generally to assessment of the stability of systems with interconnected components. More specifically, but not by way of limitation, this disclosure relates to systems and methods that may utilize techniques to detect the impact of a potential change on a system prior to the change being made.

BACKGROUND

Modern production environments may be complex systems that may include interdependent applications, microservices, and infrastructure components. These systems may collectively support various computing platforms or services (e.g., cloud computing, edge computing, data access, etc.). In part due to the complexity, these environments are particularly prone to instability when updates or changes are made, such as software upgrades, certificate renewals, or server patches. Often, such changes can inadvertently disrupt operations if other interconnected components (e.g., applications, microservices) are not examined in advance. Such disruptions can have significant impacts in environments that rely on high resource availability and interconnectedness of environmental components, particularly when system stability is desirable.

SUMMARY

Various aspects of the present disclosure provide a system and methods for estimating the impact of a potential update or change to one or more components (e.g., files, applications, configurations, certificates, server settings) within a live production environment.

Aspects of the disclosed technology include methods, computer readable media, and systems of one or more computers that can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Aspects include a computer-implemented method for assessing stability in a production environment. The computer-implemented method may include generating, by a processor, a weighted dependency graph representing the production environment by: retrieving, by the processor, a configuration file representing a configuration of applications within a production environment; generating, by the processor and based on the configuration file, a dependency graph representing the production environment, the graph may include nodes and edges, where a structure of the dependency graph is based on relationships identified between the edges of the production environment; retrieving, by the processor, historical incident data related to past production environment disruptions; parsing, by the processor, the historical incident data to extract one or more attributes of at least one historical incident; and generating, by the processor and based on the extracted attributes, weights for the nodes or edges of the dependency graph. The method may include receiving, by the processor, a potential update to the production environment. The method may include generating, by the processor, an impact score of the potential update by utilizing at least the weights of the weighted dependency graph. The method may include transmitting, by the processor and to a computing device, an alert when the impact score is above a threshold value. Additional aspects of the disclosed technology include corresponding computer systems, apparatus, and computer programs recorded on one or more computer storage devices.

Aspects of the disclosed technology may include one or more of the following features. The method where the attributes of the incident include at least root causes, source applications, and impacted downstream applications. The method may include receiving, by the processor, additional incident data related to a production environment disruption; recalculating, by the processor, weights for the nodes or edges of the weighted dependency graph; and updating, by the processor, the assigned weights of the weighted dependency graph with the recalculated weights. Each node represents an application and weights may be based on at least a tier of the application. Weights may be further based on at least a tier of one or more applications downstream from the application. The method may include generating, by the processor, an updated graph based on a predicted effect of the potential update; and transmitting, to the computing device, the updated graph for display on a user dashboard, the updated graph illustrating a predicted risk associated with the potential update. The method may include preventing the potential update from being pushed to the production environment when the generated impact score is above a threshold value. The weights may be based on a plurality of neural networks, each of the plurality of neural networks corresponding to each node of the weighted dependency graph. The weights may be based on a plurality of neural networks, each of the plurality of neural networks corresponding to each node of the weighted dependency graph, where each of the plurality of neural networks outputs a weight for its respective node. The weights may be calculated based on downstream calculations of a first node. The method may include performing, by the processor, a remediation action within the production environment when the severity score is above a threshold. The remediation action may include an update to an application, a rollback to an application, a change to a configuration file, or isolation of one or more affected components of the production environment. Each node represents an application and weights may be based on at least a tier of the application.

Aspect includes a system for assessing stability in a production environment. The system may include a processor. The system may include a memory storing instructions that, when executed by the processor, cause the system to perform one or more actions. The system may include generate a weighted dependency graph representing the production environment by: retrieving a configuration file representing a configuration of applications within a production environment; generating and based on the configuration file, a dependency graph representing the production environment, the graph may include nodes and edges, where a structure of the dependency graph is based on relationships identified between the edges of the production environment; retrieving historical incident data related to past production environment disruptions; parsing the historical incident data to extract one or more attributes of at least one historical incident; and generating and based on the extracted attributes, weights for the nodes or edges of the dependency graph. The system may include receive a potential update to the production environment. The system may include generate an impact score of the potential update by utilizing at least the weights of the weighted dependency graph. The system may include transmit to a computing device, an alert when the impact score is above a threshold value. Additional aspects of the disclosed technology include corresponding computer systems, apparatus, and computer programs recorded on one or more computer storage devices.

Aspects include a non-transitory computer-readable medium storing instructions The non-transitory computer readable medium storing instructions may include generating, by a processor, a weighted dependency graph representing the production environment by retrieving, by the processor, a configuration file representing a configuration of applications within a production environment; generating, by the processor and based on the configuration file, a dependency graph representing the production environment, the graph may include nodes and edges, where a structure of the dependency graph is based on relationships identified between the edges of the production environment; retrieving, by the processor, historical incident data related to past production environment disruptions; parsing, by the processor, the historical incident data to extract one or more attributes of at least one historical incident; and generating, by the processor and based on the extracted attributes, weights for the nodes or edges of the dependency graph. The instructions may include receiving, by the processor, a potential update to the production environment. The instructions may include generating, by the processor, an impact score of the potential update by utilizing at least the weights of the weighted dependency graph. The instructions may include transmitting, by the processor and to a computing device, an alert when the impact score is above a threshold value. Additional aspects of the disclosed technology include corresponding computer systems, apparatus, and computer programs recorded on one or more computer storage devices.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION OF THE INVENTION

Figure 1:
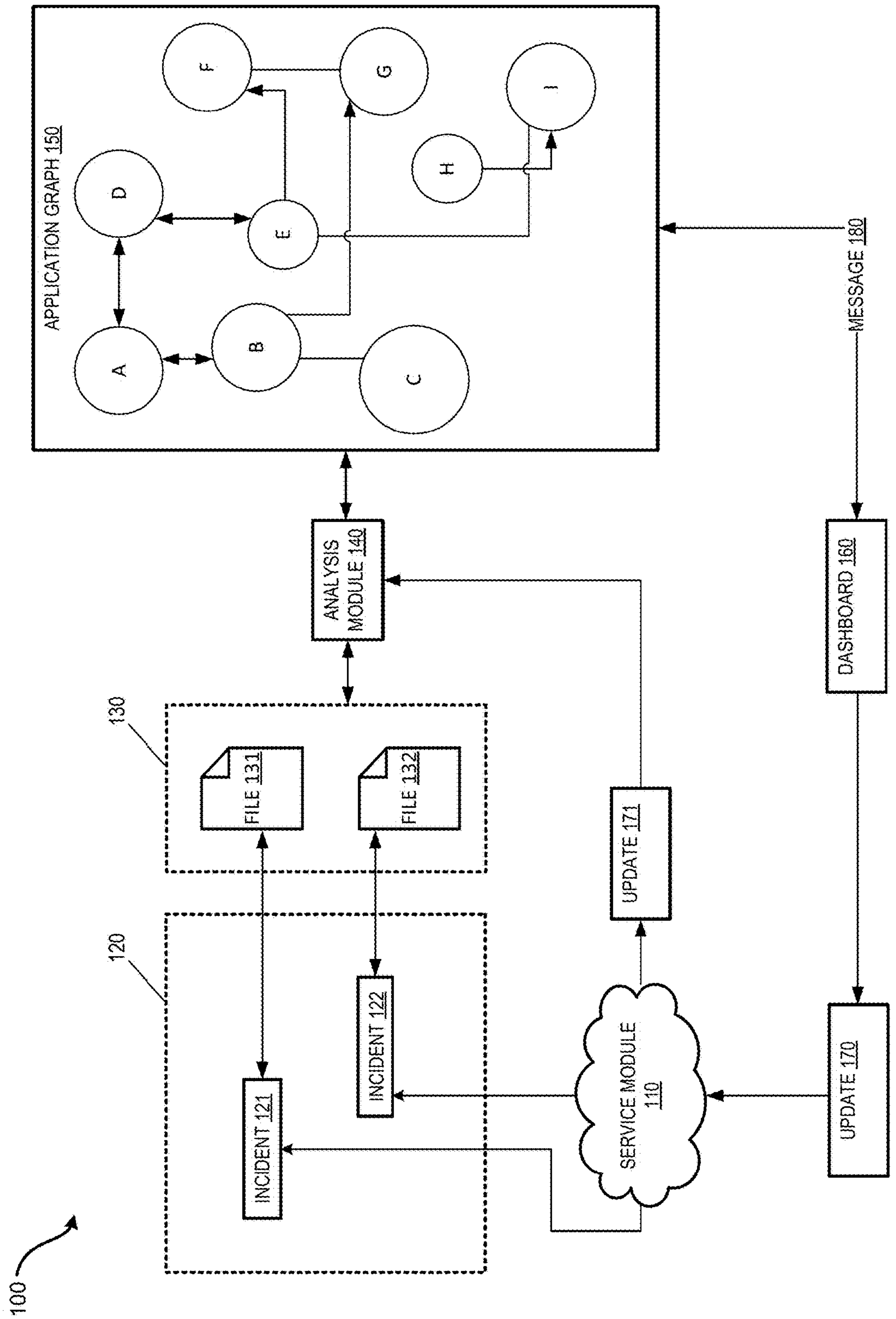
FIG. 1 illustrates an overview of a verification system architecture, according to some aspects of the present disclosure.

The present disclosure addresses challenges in determining environment stability when changes made to one application may have downstream effects. The disclosed technology may utilize historical incident data, mapping dependencies between applications (or other components of a system), and evaluate the potential impact of proposed changes to the system. By using an automated approach to assess changes before they are approved, this system helps prevent unexpected disruptions and supports a more stable production environment. The technology may be particularly useful in complex environments like secure information retrieval (e.g., from cryptographically secure systems), resource providing systems, secure computing environments, distributed computing systems, parallel computing, cloud computing, computing environments with specialized hardware (e.g., application-specific integrated circuits with specific configuration files for specific computing tasks), etc., where production systems may be highly interdependent, and interruptions can have widespread consequences.

One aspect of the present disclosure is the ability for a change or impact to an environment to be assessed prior to the implementation of the change. As environments have numerous applications and services that rely on each other to function correctly. For instance, a simple certificate upgrade in one application might lead to unexpected downtime in multiple other applications if these applications were not properly informed. The disclosed technology enables the identification of a root cause, reducing the time to take corrective action. The disclosed technology allows for the management of production environments to be simplified and the impact of any changes to the production environment to be assessed in a practical and simplified manner, including the generation of scores, metrics, visualization of impacts, and the automation of aspects of managing the environment (e.g., denying updates if the impact is too high, automatically allowing a change to be made if the predicted impact is low, rolling back a change if the impact is determined to be high, generating an alert for a user to review and approve if the impact is between two values, etc.).

The disclosed technology may provide advantages in managing updates in a production environment. One aspect of the disclosed technology is the ability to proactively assess risks by utilizing historical incident data to understand how prior changes have impacted a system. By learning from past incidents, the system may identify root causes linked to specific applications or configuration items, enabling the disclosed technology to predict potential impacts of future changes. This may reduce reliance on manual reviews and helps to prevent unexpected incidents before they occur.

Another aspect of the disclosed technology is the ability to automate dependency mapping between components (e.g., applications) of a system. This may provide an understanding of how applications within the production environment are interconnected. The mapping may include details to allow information about one application to be analyzed for its effects on all related applications. This may in turn allow for creating a more resilient and robust environment. The technology's automated dependency mapping allows it to evaluate how changes to one application may affect others, reducing the need for manual oversight and enabling more informed decision-making.

The disclosed technology may include a dynamic dashboard that allows for visualization of the impact of a change or an existing topology of the production environment. In some examples, the impact of a change or a potential change to the system may be visualized in real-time, enhancing operational visibility and allowing operators of a system to monitor ongoing changes. The disclosed technology may include an API that may permits querying for impact severity of a change. This may enable integration with deployment workflows. Further, automated alerts and notification systems may be supported by the disclosed technology to ensure that affected teams are informed and that critical dependencies are maintained when changes are being made. The API-based access to severity scores may enable external systems to retrieve impact assessments and make informed decisions based on real-time data.

The disclosed technology extends to managing dependencies within production environments components, such as security certificates, middleware, and backend services, which may play a role in application stability. When updates to infrastructure components (e.g., certificate renewals, server updates, etc.) occur, they may impact multiple applications if not carefully managed. The technology may account for these multiple dependencies by representing elements as nodes within a dependency graph, allowing the technology to analyze or mitigate the risk associated with their updates.

Application tiers or application ranking may influence risk assessments. The ranks or tier of an application may be represented or related to a weight of the node that represents the application. The technology may allow for continual adjustment of these ranks or tiers based on real-time operational data and historical incident frequency. By recalculating severity levels or weights (node weights, edge weights, etc.) with each new incident or update to the production environment, the system may provide a responsive and accurate assessment of production stability. Concurrent updates and overlapping change windows may be considered as well. The disclosed technology allows for assigning additional weights to these scenarios due to their potential to increase instability. Thus, the disclosed technology may allow for continuous monitoring and updating of the dependency graph, recalculating weights dynamically as incidents are resolved or new data is received. In this manner, an up-to-date overview of the production environment may always be available.

The disclosed technology may include automated alerting and notification features that communicate incident information to predefined devices or endpoints associated with affected applications. The alerts may be based on threshold values and be configured to be transmitted to impacted users or entities associated with nodes which may be impacted from a potential update.

An incident or change file may be a "base." A file may be generated from an incident or a base, which may act as a basis for generation of the graphs discussed below.

I. Example Architecture for Assessing Environmental Stability

FIG. 1 illustrates an overview of an environment stability assessment architecture, according to some aspects of the present disclosure. Illustrated in FIG. 1 is an architecture 100 that may be configured to analyze the impact of changes in a production environment. The architecture 100 may include a service module 110, an incident store 120, a file storage module 130, an analysis module 140, an application graph 150, and a dashboard 160. As further explained below, these components may interact with one another to gather, process, analyze, and visualize data related to incidents within the production environment, and may provide an assessment of stability risks associated with changes to the production environment.

Architecture 100 may be used to monitor incidents or changes that occur within a production environment. It may be used to collect data from multiple sources to understand the scope and severity of each event which may occur with respect to a production environment. Architecture 100 may be used to map out dependencies between applications. The dependencies may be used to identify potential points of failure or areas where changes to one application (or other system component) might propagate through interconnected services. This approach may allow for proactive risk management, as the system can help operators evaluate the stability of the environment before, during, and after changes are implemented. Through real-time visualization on the dashboard 160, operators may gain insight into which applications are impacted by changes and assess the overall stability status of the environment. This information can then guide decision-making, reducing the likelihood of unforeseen disruptions.

The service module 110 may function as a platform for managing incidents and processing change updates within the environment. Service module 110 may be capable of receiving and digesting information related to one or more incidents which occur in relationship to a production environment. For example, the service module 110 may include the ability to digest the incidents 121 and 122 which may be contained in the files 131 and 132 respectively. The service module 110 may connect to external systems, such as incident management platforms, to retrieve incident data as it becomes available. The service module 110 may also facilitate the flow of change requests or configuration updates, such as the update 170, which may include details on modifications to applications or infrastructure components. The service module 110 may receive the update 170 and process the update 170 to generate or transform the update 170 into update 171. This may include processing the update 170. In other examples, update 171 and update 170 may be similar and be only formatted in different manners.

Service module 110 may also handle both automated and manual data inputs. For instance, service module 110 may be configured to automatically collect incident data from monitoring tools like Splunk or Dynatrace, which may trigger incident creation based on pre-defined thresholds, such as CPU usage or network latency. In other examples, manual inputs may also be possible, through which operators may log incidents directly when they identify issues. Service module 110 may also provide an API to allow other applications or services to push change data into the architecture 100. By accessing data from external sources, the service module 110 may help ensure that the system has current and comprehensive information on incidents and potential impacts, which can be used to support stability assessments and facilitate timely decision-making.

The incident store 120 may be responsible for categorizing and organizing incident data which has been collected by one or more components of architecture 100. Incident store 120 may include multiple incidents, including historic information, such as incident 121 and incident 122. Each incident may represent distinct occurrences within the production environment. For each incident, the incident store 120 may extract specific details, including the root cause, source application, and any affected downstream applications. This information might then be structured into a standardized format, allowing the system to analyze and utilize the data effectively.

Incident store 120 may also include severity levels to incidents based on criteria such as the criticality of the affected application, the nature of the incident, or the potential impact on other components. For instance, an incident affecting a "tier-one" application may be marked as high severity due to its importance within the environment. The incident store may further enrich incident data by linking it with historical incident records, analyzing for similar incidents, or examining incidents affecting the same application (e.g., a previous version of the application, an application which is defined or marked to have the same functionality as the affected application, etc.), which may help identify recurring issues or patterns. By structuring and categorizing incident data, the incident store 120 can streamline subsequent analysis and support a more accurate assessment of the production environment's stability.

The file storage module 130 may store incident data in a structured format that facilitates efficient retrieval and analysis. Each incident, such as incident 121 and incident 122, might be recorded in separate files, represented as file 131 and file 132, respectively. These files may contain essential attributes associated with each incident, including the source application, tier level, impacted applications, and other relevant details. The data format may be standardized, such as JSON, XML, or another structured format, enabling seamless parsing and processing by other components within the system.

The file storage module 130 may be configured to organize files to support both real-time and historical analysis. For example, files may be cataloged based on incident date, severity level, or affected applications, allowing architecture 100 to quickly access relevant data during an impact assessment. Additionally, the file storage module 130 may have the capability to archive older files, preserving historical data that can be used for trend analysis or identifying recurring stability issues. By maintaining a repository of incident data, the file storage module 130 may enhance the system's ability to conduct in-depth analyses and support proactive stability management. The file storage module may also limit assessment to a certain time period (e.g., last 3 months, last 6 months, last 100 changes to the environment, last 10 versions, etc.).

The file storage module 130 may store incident data in a structured format that may facilitate efficient retrieval and analysis. For each incident, such as incident 121 and incident 122, a corresponding file, represented as file 131 and file 132 respectively, may be created to encapsulate the details of that specific incident. Each file may contain essential attributes related to the incident it represents, including the source application, tier level, impacted applications, and any additional relevant information. By organizing data on an incident-by-incident basis, the system can maintain clear records that support targeted analysis and historical trend evaluation. Files may be stored in a standardized format such as JSON or XML, which allows the system to efficiently parse the data for further processing. For example, if the incident 121 impacts several applications within the production environment, the file 131 would include a comprehensive list of those affected applications, their relationships, and other contextual information relevant to the incident. Similarly, the file 132 may provide a detailed breakdown of the incident 122. By associating each file directly with its corresponding incident, the file storage module 130 may enhance the system's ability to analyze and cross-reference incidents based on their specific attributes. In some examples, multiple incidents may be associated with one file.

Analysis module 140 may serve as a component for evaluating incident data and assessing potential stability risks within the production environment. This module may process the structured data stored in the files 131 and 132 within the file storage module 130. The analysis module 140 may be used to first generate a mathematical structure (e.g., a graph, a directed graph) to explain the interconnection of various applications or other components within a production environment. This may be based on information obtained from a service module, configuration files, or other information. Thereafter, analysis module 140 may use incident files to update and refine the understanding of application relationships and dependencies within a production environment. By drawing from historical incident data, the analysis module 140 may identify patterns, recurring issues, or particularly vulnerable applications, which can inform future stability assessments.

The analysis module 140 may incorporate various algorithms to calculate the severity of each incident and assign weights to nodes within the application graph 150. These weights may be based on several factors, including the tier level of the affected application, the number and criticality of downstream dependencies, and any additional contextual factors like concurrent changes or historical failure rates. The module may use any suitable method to determine a severity score. For example, the module may include formulas use a formula that includes both direct and indirect dependencies, providing a more holistic view of each application's impact within the network.

In addition to assigning weights elements of the application graph 150, the analysis module 140 may support functionality such as dependency impact simulation. For example, before implementing a change, the analysis module 140 may be used to simulate the effects of the change across the application graph 150. Thus, the impact may be visualized (e.g., the impact on various interconnected nodes). Such a simulation may be useful in environments where certain changes have the potential to trigger cascading failures. By simulating these impacts, operators of the production environment may identify high-risk scenarios and adjust their deployment strategies accordingly.

In some examples, the analysis module 140 may have adaptive learning capabilities, allowing it to improve its predictions over time. As new incidents are processed, the module may refine its weighting algorithms based on observed outcomes, such as incident resolution times and the effectiveness of mitigation strategies. This adaptive approach may help the system more accurately predict the potential impact of future incidents and support more nuanced decision-making.

The analysis module 140 may also facilitate real-time updates to the application graph 150, ensuring that it accurately reflects the current state of the environment. This dynamic updating process may involve recalculating weights and dependencies whenever a new incident is logged, ensuring that operators have access to up-to-date stability assessments. In other examples, when a change is made but no incident is logged or created, that information may also be provided by the service module 110 to the analysis module. Additionally, the analysis module may trigger alerts or cause messages to be transmitted to the dashboard 160 when specific conditions are met, such as when an application's weight surpasses a predefined threshold, indicating a heightened risk to the environment. In this manner, the analysis module 140 may act as an intelligent assessment engine within the environment stability assessment system 100, providing operators with actionable insights into how incidents and changes may affect the broader production landscape.

The application graph 150 may serve as a dynamic, visual representation of a production environment, including the most recent configuration of the environment. The application graph 150 may be a mathematical construct (e.g., a mathematically defined graph with vertices and edges). The application graph 150 may be a directed or undirected graph.

Each node on the application graph 150 (labeled A, B, C, etc.) may represent an application, component, microservice, configuration file, or other functional element within the production environment. Although illustrated as a graph, equivalent mathematical representations of the graph may be used by the architecture 100. For example, the application graph 150 may be defined as a set of vertices and edges. In some examples, the graph may be cyclical. In this case, algorithms may be used to detect that the graph is cyclical, and certain edges (e.g., edges with a low impact on the overall environment) may be removed to avoid the cyclical graph and to ensure that the computation of a singular change is not computed in a cyclical manner. In some examples, the application graph 150 may be referred to as a dependency graph. The application graph 150 may be weighted based on historical incidences. The application graph 150 may be unweighted when created only from a configuration file (e.g., only representing the relationships between the nodes).

The application graph 150 may illustrate or allow for a visualization of the interdependencies between various applications. Each application in the environment may be represented as a node (labeled A, B, C, etc.), while the edges connecting nodes may indicate dependencies between these applications. For instance, a node representing a centralized payment service may have edges connecting it to other nodes that represent dependent services, such as database servers, authentication modules, or user-facing applications. The application graph 150 may therefore provide operators with a clear view of how changes in one application might ripple through the network, affecting multiple interconnected services.

The application graph 150 may continuously update based on data processed by the analysis module 140, which may include information on new incidents, resolved issues, and changes to dependencies. For example, update 170 may cause a change to the production environment resulting in a change to the application graph. This dynamic updating ensures that the graph remains an accurate reflection of the current state of the environment. As incidents are logged and processed, new nodes and edges might be added to represent additional applications or newly discovered dependencies. The graph might also adjust existing connections if the underlying architecture changes, such as when applications are added, removed, or reconfigured.

In addition to illustrating dependencies, the application graph 150 may also include weighted nodes, where each weight reflects or is related to the impact potential of an application it represents. These weights might be visually represented by varying node sizes or colors in the dashboard 160, helping operators quickly identify high-impact applications. For example, nodes with higher weights may appear larger or in a distinct color, signifying that changes to these applications may have significant consequences for the production environment. This visual distinction may allow operators to quickly assess the areas of greatest concern during stability evaluations.

The application graph 150 may further support advanced filtering and customization options, allowing operators to focus on specific tiers, incidents, or application groups. For instance, an operator might filter the graph to display only tier-one applications, which represent the most critical services within the environment. Alternatively, the operator may isolate nodes affected by recent incidents, providing a focused view of the areas currently under scrutiny. This flexibility may aid in incident response and root cause analysis, enabling operators to drill down into specific areas of the environment as needed.

To enhance decision-making, the application graph 150 might also support live interaction with other components of the system. For example, an operator may select a node within the graph to view additional details about the corresponding application, such as historical incident data or specific dependencies. This interactive capability may streamline the process of assessing the potential impact of changes, as operators can access relevant information directly from the graph interface. Additionally, by integrating with the dashboard 160, the application graph 150 may provide visual indicators of ongoing changes, such as color-coded status markers that update as incidents are resolved or validated. In this manner, the application graph 150 may function as a comprehensive map of the production environment's interdependencies, helping environmental operators manage and assess the stability of interconnected applications with greater accuracy and efficiency.

The dashboard 160 may function as a visualization or control interface that provides real-time insights into the status of applications within the production environment. The dashboard 160 may display a comprehensive view of the application graph 150, allowing operators to monitor the health and stability of interconnected applications. The dashboard 160 might present data in an intuitive format, such as color-coded nodes and visual alerts, enabling operators to quickly identify areas of concern and take corrective actions as needed. In some examples, different types of nodes (microservices, applications, etc.) may be sized, shaped, or colored differently to understand the impact of the same. Dashboard 160 may receive a message 180 which has been transmitted from the analysis module 140 or from a module related to the application graph 150. The message 180 may be an approval message, a denial message, or message which includes information about the severity of the change. For example, message 180 may define or provide severity of a change based on the update 170 or the update 171. Dashboard 160 may send a message out to a receiving application based on an analysis module, e.g., an approval, denial, or severity information contained message.

The dashboard 160 may also include a color-coded status system to reflect the current stability of each node. For example, nodes undergoing changes or validation might be marked in yellow, while those that have been confirmed as stable may appear in green. In cases where an incident is actively affecting a node, the dashboard might display the node in red, signaling a high-priority issue that requires immediate attention. These color indicators may update in real-time as the system processes new incidents, change requests, and validations, providing operators with an up-to-the-minute view of the environment's status. In other examples, historical incidents may be visualized in the same way to allow for the dashboard 160 to be used for a manual examination of the environment.

In addition to visual cues, the dashboard 160 may provide detailed information on individual nodes, including metrics such as the current weight, recent incidents, and a list of dependent applications. A user or operator may access this information by selecting a node within the dashboard interface, which may bring up a detailed panel showing historical data, impact assessments, and associated distribution lists for notification purposes. This feature may aid in root cause analysis and help operators understand the broader context of an incident, facilitating more informed decision-making.

The dashboard 160 might also integrate with other components of the system, such as the analysis module 140 and the application graph 150, to support live interaction and data retrieval. For instance, when a new change request is submitted, the dashboard may automatically display the predicted impact on connected nodes, allowing operators to assess the potential severity before implementing the change. The dashboard may further support "what-if" scenarios by enabling operators to simulate changes and observe potential impacts on the graph. This capability may assist in planning and risk management, as operators can proactively evaluate various deployment strategies and their implications.

The dashboard 160 may feature alerting and notification capabilities to ensure that relevant users, operators, or entities are informed about ongoing changes or incidents. The system may be configured to send automated alerts to users or entities associated with applications affected by a particular change. As an example, the alerts may include key details such as the incident source, affected nodes, and estimated resolution time, helping teams prepare for potential disruptions. Additionally, the dashboard 160 may log all alerts and notifications, maintaining an audit trail that may be used for post-incident review and analysis. To support long-term stability assessments, the dashboard 160 might also provide reporting functions that aggregate data over time, providing insights into recurring issues and trends. These reports may highlight metrics such as incident frequency, average resolution time, and common root causes, enabling operators to identify areas for improvement. By presenting a holistic view of the environment's performance, the dashboard 160 may help develop strategies for enhancing resilience and preventing future incidents.

Turning back to the analysis module 140, the analysis module 140 may also receive inputs from various sources, such as a potential update (referred to as update 171). Update 171 may represent changes, modifications, or adjustments within the production environment that do not necessarily originate from incidents. For example, update 171 may include software version changes, configuration adjustments, or maintenance activities. Each update may impact one or more applications and influence the dependencies within the application graph 150.

The analysis module 140 may evaluate the update 171 in a similar manner to how it processes incidents. When the update 171 is received, the analysis module may determine its scope by identifying the source application and any directly or indirectly affected applications. The determination may involve recalculating the weights associated with affected nodes, based on factors such as the criticality of the update, the number of impacted downstream services, and the tier level of the application being changed or updated. For instance, an update that alters a core configuration setting within a high-tier application may have a more significant weight than a routine maintenance update in a lower-tier application. An application may refer to a software package, program, routine, subroutine, or independent module which may provide functionality. An application may bundle together multiple features or functionalities. An application may be user accessible or only be accessible by other modules, through APIs, specific secure servers, or through tokens. An application may rely on or use other configuration files, routines, APIs, or communicate with other applications.

The analysis module 140 may assess updates 171 for potential ripple effects across the production environment. By utilizing the application graph 150, the module can trace the connections from the source node of the update to its dependent nodes, evaluating how far-reaching the update's impacts may be. This assessment may allow the system to anticipate indirect consequences, helping operators make more informed decisions before deploying the update. If the analysis module identifies a high-risk update, it may trigger alerts or suggest scheduling changes to reduce potential disruptions. The update 170 or the update 171 may be generated as a package which is transmitted for integration in the production environment. The package may include other routines, subroutines, APIs to call other software components, and versions. The update 140 may also be encapsulated and be provided from external services, or include multiple upgrades to the production environment. Some upgrades may be provided through external servers while others may be provided from "on-premises" infrastructure. The upgrade may be an update that is pushed as a message with an identifier to the location of the code, dependencies, and other metadata which is related to the service. The update 170 may also include a compiler version which was used to generate the package to allow the analysis module 140 to further isolate dependencies within the software, code, or API. Further, the update 170 may be performed as a task. The task may also include a flowchart which is submitted alongside the update 170.

The analysis module 140 may also log updates, metadata, generated graphs, or other information with incident data in the file storage module 130, storing them in the file storage module 130 for future reference. Logging may enable the architecture 100 to store comprehensive history of both incidents and updates, providing insights for trend analysis and long-term stability assessments. By maintaining a detailed record of updates, architecture 100 may support operators in identifying patterns, such as frequent updates to specific applications or common configurations that often lead to instability. These insights can inform future planning and assist in optimizing stability management strategies. This dual approach to analyzing incidents and updates may allow the system to respond dynamically to changes, helping maintain a stable and resilient environment over time.

In some examples, the update may be an upgrade or a series of upgrades to the production environment. The analysis module 140 may contain a complier or other software determine dependencies between nodes. This may include the use of task schedulers, middleware, deployment environments, calling or establishing microservices, ensuring specific customizations are considered, bundling of specific services which would be called or used by the update, the use of APIs and other functions included in an upgrade (e.g., update 171), code version resolvers, task schedulers, etc. The analysis module 140 may be run on a sandboxed environment to ensure that aspects of the code being received is secure. The sandboxed environment may be a cloud environment which is kept up to date. The sandboxed environment may be encapsulated on virtual machines which emulate the production environment which is to be used. Further, the analysis module 140 may also include other environments, such as an environment where microservices are available, such as ensuring that endpoints are established correctly within the environment, latency is emulated or simulated within the sandboxed environment, that other services are integrated into the sandboxed environment or otherwise accessible, and that the update can be managed or rolled back. The analysis module 140 may also be able to include code dependencies to ensure that an upgrade to the software, code, applications, microservices, bundles, or the underlying environment itself (e.g., the cloud environment or physical hardware supporting the computing environment) is feasible. The analysis module 140 may also suggest an upgrade path to allow the update 170 or the update 171 to be performed with the least number of critical issues. Further, the analysis module may perform a trace on prior incidents to determine or construct a root issue.

Further, the analysis module may generate actionable insights in an XML or other format which may be transmitted to the dashboard 160. The actionable insights may include multiple windows or overlays, highlights, text derived from machine-learning models for insights related to the change and historic issues with a specific application, prior disruptions, etc. The actionable insights may also indicate corrective actions and why an issue was generated (e.g., too high of a latency leading to timeouts of called APIs, API overload, recursion of API functions, etc.).

Analysis module 140 may employ any suitable algorithm to determine the application graph 150 or other aspects of the production environment. This may include machine learning models, neural networks, and other adaptive algorithms. As one example, the analysis module 140 may utilize a weighted dependency impact algorithm to determine the severity of incidents based on the relationships within the application graph 150. This algorithm may analyze the network of nodes and edges to assess risks associated with specific incidents or updates, factoring in the tier level of affected nodes, the number of downstream dependencies, and any concurrent changes.

In some examples, the analysis module may read a configuration management database (CMDB) data and create a neural network for every application. Thus, the analysis module 140 may generate multiple neural networks. Each neural network may be interlinked with a neural network for each other application. Alternatively, a neural network may be created for the application alone. The neural network may be used to determine an impact when the analysis module 140 determines that a change may directly impact a specific application (e.g., based on the CMDB, other configuration files, or other information). Within a neural network, each application may act as a node of the application, and the weight of the node may be calculated based on the tier of the application and the number of downstream application impacts. The weights and training of the neural network may be based on historical information and training, and the neural network may be periodically trained and updated over time.

As one example, assume that incident 121 is logged and impacts a "core" application, represented by "A" within application graph 150. Node "A" may be a tier 1 application and represent an application (e.g., application A). This incident data may be stored in file 131. Node A may have downstream dependencies on node B and node D, which may both be "tier 2" applications. The algorithm might start by assigning node A an initial weight of 5, reflective of its tier level and critical role within the environment. Thereafter, the algorithm may evaluate node A's dependencies (e.g., node B and D), adding additional weight based on the tier of each downstream application. With a dependency factor set at 0.5, each downstream tier 2 node might contribute 1 to node A's weight. Therefore, the dependencies on node B and node C would collectively add 2 to the initial weight, resulting in a total of 7 for node A. Other missing links with certain other critical applications may decrease the score for node A. For example, if node H and node I are both tier 1 (or applications of a higher tier than node A), a value may be subtracted from the weight. The weights may be assigned to individual edges of the graph or to the nodes themselves.

Continuing with the hypothetical example, if there are concurrent updates associated with node A (e.g., such as through the update 170 or the update 171), the algorithm may apply a multiplier to account for the increased risk. Assuming a multiplier of 1.2, the total weight of node A may then be calculated as 7×1.2=8.4 indicating a heightened level of risk due to the concurrent changes.

The algorithm used by the analysis module 140 may also propagate a portion of this weight to the downstream nodes. For example, node B and node C may each inherit 25% of node A's total weight. This may add an impact of 2.1 to each, resulting in a final weight of 4.1 for both node B and node C. Based on predefined thresholds, the algorithm may classify node A as a high-severity risk with a weight of 8.4, while node B and node C might fall under medium severity, due to weights of 4.1. In this manner, through assigning severity levels, the analysis module 140 may provide operators with actionable insights, such as triggering alerts or recommending changes. This approach may enable the environment stability assessment system 100 to dynamically evaluate risks, maintain stability, and ensure the continuity of critical applications.

Although the description above has been provided with respect to the nodes, in other examples, the links between the nodes may be based on historical connectedness of changes between applications, known dependencies between applications, or based on modeling of the interconnectedness of the applications. In this manner, the score for a particular change or a particular application may be based on the historical connectedness of changes between applications.

In some examples, the architecture 100 may facilitate tools for scheduling maintenance, reconfiguring application settings, or temporarily rerouting traffic away from high-risk applications. By taking these preventive actions, operators may reduce the overall risk of incidents and improve the stability of the environment over time. Additionally, application tiers may be reviewed and or adjusted dynamically as they influence risk assessments. One or more modules may adjust application tiers based on operational data and historical incident frequency. By recalculating weights and severity levels with each new incident or update, the system provides a responsive and accurate assessment of production stability. Concurrent updates and overlapping change windows are considered as well, with the system assigning additional weights to these scenarios due to their potential to increase instability.

Architecture 100 may also allow for automated alerting and notification features that communicate incident information to predefined distribution lists associated with affected applications. Furthermore, the architecture 100 may allow for continuously monitoring and updating one or more dependency graph(s) (e.g., application graph 150), recalculating weights dynamically as incidents are resolved or new data is received, and maintain a real-time stability overview of the production environment.

Additionally, through the use of predictive analysis (e.g., by utilizing neural networks, machine learning, or other detection algorithms) the system may refine and/or adjust risk scores, thresholds for alerts, or the types of alerts transmitted based on user feedback. This may allow the architecture 100 to adapt its assessments over time. Further, certain incidents may be trivial while others have severe effects. This information may be included to adjust or modify the weighting of various nodes (e.g., applications) within the graph. Additionally, the thresholds may be adjusted for sub-graphs, or subsets of a production environment. In other examples, different thresholds may be used for different production environments. In yet other examples, cross-training from closely related production environments of machine learning models may occur to allow for more robust training with limited production information.

II. Techniques for Analyzing Changes to a Production Environment

Figure 2:
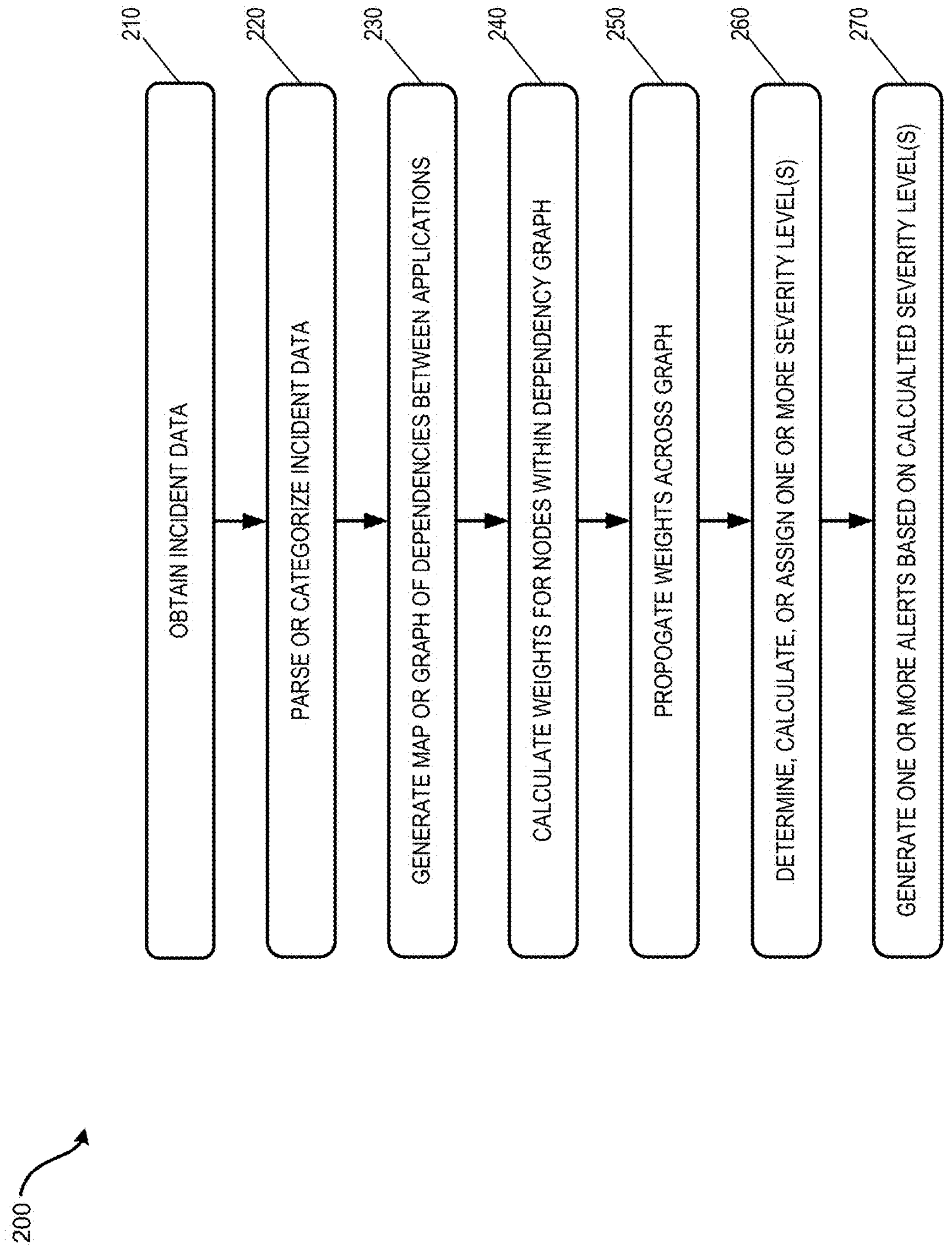
FIG. 2 is an example of a flowchart showing estimating the impact of an update to a production environment based on known dependencies within the production environment, according to some aspects of the present disclosure.

FIG. 2 is an example of a flowchart showing estimating the impact of an update to a production environment based on known dependencies within the production environment, according to some aspects of the present disclosure. Illustrated in FIG. 2 is method 200. Method 200 may be used for model training and data preprocessing, according to some aspects of the present disclosure. One or more computing devices depicted in FIG. 3 may implement operations by executing suitable program code (e.g., the analysis module 140). For illustrative purposes, the method 200 is described with reference to certain examples depicted in the figures. Other implementations, however, are possible. While the blocks of the method 200 are described in the temporal order below for illustrative purposes, it may be appreciated that the blocks can occur in any order and some blocks may occur simultaneously.

At block 210, incident or update data may be obtained. In some examples, external sources may be used to identify the incident or update data. For example, the incident data may be manually inputted. In other examples, external sources or automated tools may generate an incident report or incident file based on an incident. This information may be facilitated by the service module 110. This information may be information which has not yet processed but identifies that an update or incident has previously taken place. The information may be stored in a temporary store prior to further analysis or processing.

At block 220, the data related an incident may be parsed or categorized. The information obtained in block 210 may be parsed to ensure that it includes certain details, such as a root cause (or change which initiated the incident to occur), affected applications, source of the change, impacted applications, impacted configuration items, tier of the application, or update data may be obtained. In some examples, external sources may be used to identify the source of the incident. At this block, incidents and updates may be categorized based on attributes like severity, type, and associated application tier. At this block, the parsed or categorized data may be stored in structured files within the file storage module 130. Each incident or update, such as incident 121 or update 170, may be saved as a separate file (e.g., file 131 or file 132). The system may use formats like JSON or XML, which allow the data to be accessed and analyzed efficiently. By organizing the data into structured files, the system ensures that it can quickly retrieve and process relevant information during impact assessments. In some examples, simplified formats may be used. For example, a format for any incident may include at least: Change Made, Source of Change (e.g., directly affected application or configuration item), Impacted Applications, Tier of Impacted Applications.

In block 230, dependencies between applications may be mapped. This may include affected applications or all applications within the neural network. This step may utilize a CMDB file. The generated map may be used to create a neural network for each node or application within the generated map. The map may be similar to the application graph 150. In some examples, the analysis module 140 may be used to create a dependency may as represented by the application graph 150. Each application of the application graph 150 may be represented as a node, and dependencies may be shown as edges (which may illustrate how incidents and updates might propagate through the production environment). This dependency mapping provides a visual structure that helps operators understand how interconnected applications are affected by changes, forming the basis for risk assessment and impact prediction. Additionally, the mathematical structure may be used to further analyze and assign scores based on the topology of the network.

At block 240, weights may be calculated for each node in the dependency graph, using a weighted dependency impact algorithm. A neural network may be used to determine an impact or weight. The weights may be assigned to nodes reflect the criticality of each application within the network, based on metrics like application tier and the number of downstream dependencies. For instance, a core service with multiple dependencies might receive a higher weight, indicating a greater potential for impact on the stability of the environment. Various algorithms may be used to determine the weight of the node. In other examples, the weight of the edges rather than the nodes may be calculated.

As an example algorithm, for a production environment with 'n' applications (corresponding to 'n' nodes), a weight may be calculated as: Integer Value*((n*Tier of Application)+No. of Impacted Applications+(2*(impacted application having a change in the same window))/n.

In block 250, calculated weights may be propagated across one or more graphs or representations of the production environment. For example, weights may be transmitted or calculated for interconnected nodes, assessing how incidents and updates might influence related applications. For example, if an incident affects a critical application, its weight may be partially distributed to its dependencies, representing the broader impact on the environment. This step allows the system to evaluate cascading effects, providing a holistic view of how incidents propagate across the dependency network. This may be performed using neural networks, iterative calculations based on connected neural networks, or other graph based techniques. In some examples, blocks 230, 240, and 250 may be performed automatically when a change to the environment is detected or occur periodically.

At block 260, the system may determine, calculate or assigned severity levels to incidents and updates based on factors such as application tier, number of dependencies, and historical impact data. For instance, a tier 1 application with extensive downstream dependencies might receive a high-severity classification, indicating that changes to it may have widespread effects. This severity assignment step is useful for determining the priority of each incident or update and guides subsequent impact analysis.

At block 270, one or more alerts may be generated. For example, the dashboard 160 may be utilized to display an alert when a predicted severity score for an upcoming or planned change is above a threshold value. In other examples, the dashboard 160 may visualize a recalculated dependency graph, providing users or operators with a real-time or otherwise updated overview of the production environment's stability. The dashboard 160 may offer filtering options, enabling operators to view specific incident details or focus on high-severity nodes. In some examples, automatic rollbacks may take place when a severity score is above a certain threshold. In yet other examples, an update may not be pushed to the production environment or restricted from being pushed when the predicted impact or severity score is above a certain threshold. In some examples, if the predicted severity score is close to a threshold value (e.g., 10% within a threshold value), the change may be made but monitored more closely to ensure that the change does not negatively affect the system. In some examples, if the severity score is higher than a threshold value but the update or change has already been made or implemented, automated remediation measures may be made to reverse the update or change. This may include, for example, pushing a rollback related to the change that has been made. In some examples, such as when multiple components are affected by a change, the change may be provided in stages (e.g., such as by the least risky change to the riskiest change, or the change with the least impact to the severity score to the change with the highest change to the severity score). In some examples, such as when there is an adverse change to the production environment which was identified as being adverse prior to the change being made, automated remediation measures to reverse the change may be made. This may include isolating the highest tier application and rolling back the application. In other examples, another update may be pushed to negate the changes made by the change and restore the functionality of the network once a root cause of the issue has been determined. This may be performed automatically within the architecture 100, such as by the analysis module 140.

In some examples, the method 200 may occur after generation of a representation of a network environment. The method 200 may take place to determine the severity of a previous incident or to determine the potential impact of an upcoming planned (or unplanned) change to the network. The method 200 may utilize historic data to train and/or calculate potential impacts or train machine learning models. Further, changes to the production environment may cause the representation of the network environment (e.g., the application graph 150) to be updated.

III. Example of Computing System

Any suitable computing system or group of computing systems can be used to perform the operations for the techniques described herein. For example, FIG. 2 is a block diagram depicting an example of a computing device 300, which can be used to implement the risk assessment server 104. The computing device 300 can include various devices for communicating with other devices in the computing environment 100, as described with respect to FIG. 1. The computing device 300 can include various devices for performing one or more operations, such as risk assessment operations, described above with respect to FIGS. 1-2.

Figure 3:
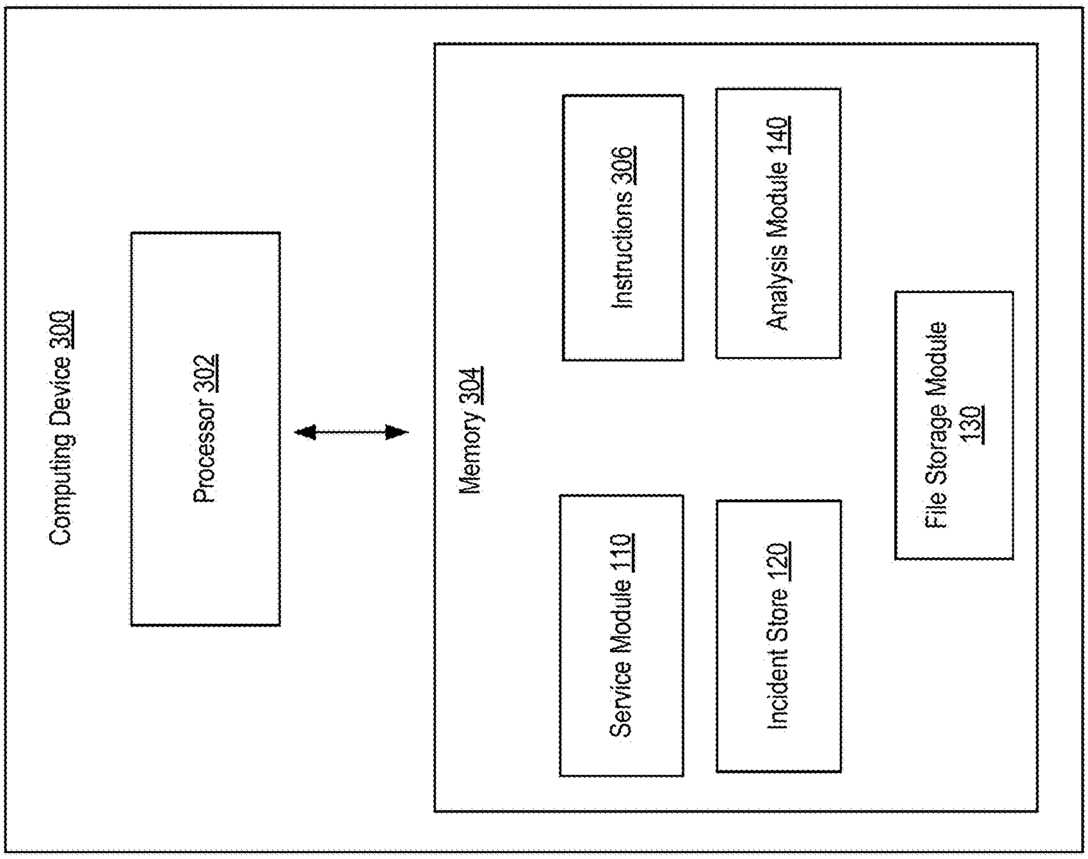
FIG. 3 illustrates an example computing system, according to some aspects of the present disclosure.

The FIG. 3 is a block diagram of a computing device 300 with instructions for performing the methods above, according to some embodiments. The computing device 300 includes a processor 302 that is communicatively coupled to a memory 304. In some examples, the processor 302 and the memory 304 may be distributed from (e.g., remote to) one another.

The processor 302 can include one processing device or multiple processing devices. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in a suitable computer-programming language, such as C, C+–, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. At least some of the memory 304 can include a non-transitory, computer-readable medium from which the processor 302 can read instructions 306. A computer-readable medium can include electronic, optical, magnetic, or other storage devices capable of providing the processor 302 with computer-readable instructions or other program codes. Non-limiting examples of a computer-readable medium include magnetic disk(s), memory chip(s), read-only memory (ROM), random-access memory (RAM), an ASIC, a configured processor, optical storage, or any other medium from which a computer processor can read the instructions 306. The memory also may include one or more modules, files, or instructions described above with respect to FIG. 1, including for example, a service module 110, an incident store 120, a file storage module 130, an analysis module 140.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A computer-implemented method for stabilizing a production environment the method comprising:

generating, by a processor, a weighted dependency graph representing the production environment by:

retrieving, by the processor, a configuration file representing a configuration of a plurality of software applications within the production environment;

generating, by the processor and based on the configuration file, a dependency graph representing the production environment, the dependency graph comprising nodes and edges, wherein each of the plurality of software applications in the production environment is represented as one of the nodes in the dependency graph and wherein the edges connect the nodes to indicate dependencies between the plurality of software applications;

retrieving, by the processor, historical incident data related to a plurality of past production environment disruptions;

structuring, by the processor, the historical incident data related to the plurality of past production environment disruptions to generate structured historical incident data, the structured historical incident data comprising, for each of the plurality of past production environment disruptions, a root cause and a set of affected software applications of the plurality of software applications;

parsing, by the processor, the structured historical incident data to extract a set of attributes of at least one historical incident, the set of attributes comprising the root cause, one or more source software applications of the set of affected software applications, one or more impacted downstream software applications of the set of affected software applications, and a tier of each of the set of affected software applications; and generating, by the processor and using a plurality of neural networks that each correspond to one of the nodes in the dependency graph, weights for the nodes of the dependency graph, wherein each of the plurality of neural networks outputs the weight for the corresponding node based on the set of attributes;

receiving, by the processor, an update implemented in the production environment;

generating, by the processor, a severity score for the update implemented in the production environment by utilizing at least the weights of the weighted dependency graph; and based on determining, by the processor that the severity score is above a threshold, performing, by the processor, a remediation action within the production environment to reverse the update implemented in the production environment.

2. The method of claim 1, further comprising:

receiving, by the processor, additional incident data related to an additional production environment disruption;

recalculating, by the processor, weights for the nodes or edges of the weighted dependency graph based on the additional incident data; and updating, by the processor, the weights of the weighted dependency graph with the recalculated weights.

3. The method of claim 1, further comprising:

receiving, by the processor, a potential update to the production environment;

generating, by the processor, an updated version of the weighted dependency graph based on a predicted effect of the potential update; and transmitting, by the processor and to a computing device, the updated version of the weighted dependency graph for display on a user dashboard, the updated graph illustrating a predicted risk associated with the potential update.

4. The method of claim 3, further comprising:

generating, by the processor, an impact score of the potential update by utilizing at least the weights of the weight dependency graph; and preventing the potential update from being pushed to the production environment when the generated impact score is above a threshold value.

5. The method of claim 4, further comprising performing, by the processor, a second remediation action within the production environment when the impact score is above a second threshold.

6. The method of claim 1, wherein the weights are calculated by the plurality of neural networks based at least in part on downstream calculations of a first node.

7. The method of claim 1, wherein the remediation action comprises a rollback to an application.

8. The method of claim 1, further comprising:

storing, by the processor and in a file storage module, the structured historical incident data for each of the plurality of past production environment disruptions as a separate incident file in a standardized format of extensible markup language (XML), wherein each separate incident file includes (i) the root cause of the past production environment disruption and (ii) the set of affect software applications associated with the past production environment disruption; and categorizing, by the processor and in the storage file module, the separate incident files for each of the plurality of past production environment disruptions in the file storage module based on a date of the past production environment disruption.

9. The method of claim 1, further comprising:

receiving a potential update to the production environment;

prior to implementing the potential update in the production environment, deploying the potential update in a sandboxed environment that is encapsulated on a virtual machine and that emulates the production environment;

subsequent to deploying the potential update in the sandboxed environment:

generating, based on the deployment of the potential update in the sandboxed environment, a machine-readable report in extensible markup language (XML) format that comprises a list of affected nodes in the dependency graph and a recommended corrective action for the potential update; and transmitting the machine-readable report to a computing device.

10. A system for stabilizing a production environment, the system comprising:

a processor;

a memory storing instructions that, when executed by the processor, cause the system to:

generate a weighted dependency graph representing the production environment by:

retrieving a configuration file representing a configuration of a plurality of software applications within the production environment;

generating, based on the configuration file, a dependency graph representing the production environment, the dependency graph comprising nodes and edges, wherein each of the plurality of software applications in the production environment is represented as one of the nodes in the dependency graph and wherein the edges connect the nodes to indicate dependencies between the plurality of software applications;

retrieving historical incident data related to a plurality of past production environment disruptions;

structuring the historical incident data related to the plurality of past production environment disruptions to generate structured historical incident data, the structured historical incident data comprising, for each of the plurality of past production environment disruptions, a root cause and a set of affected software applications of the plurality of software applications;

parsing the structured historical incident data to extract a set of attributes of at least one historical incident, the set of attributes comprising the root cause, one or more source software applications of the set of affected software applications, one or more impacted downstream software applications of the set of affected software applications, and a tier of each of the set of affected software applications; and generating, using a plurality of neural networks that each correspond to one of the nodes in the dependency graph, weights for the nodes of the dependency graph, wherein each of the plurality of neural networks outputs the weight for the corresponding node based on the set of attributes;

receive an update implemented in the production environment;

generate a severity score of the update implemented in the production environment by utilizing at least the weights of the weighted dependency graph; and based on determining that the severity score is above a threshold, perform a remediation action within the production environment to reverse the update implemented in the production environment.

11. The system of claim 10, instructions that, when executed by the processor, further configured to cause the system to:

receive additional incident data related to an additional production environment disruption;

recalculate weights for the nodes or edges of the weighted dependency graph based on the additional incident data; and update the weights of the weighted dependency graph with the recalculated weights.

12. A non-transitory computer-readable medium storing instructions that, when executed by a processor, cause a computing system to perform a method for stabilizing a production environment, the method comprising:

generating, by a processor, a weighted dependency graph representing the production environment by:

retrieving, by the processor, a configuration file representing a configuration of a plurality of software applications within the production environment;

generating, by the processor and based on the configuration file, a dependency graph representing the production environment, the dependency graph comprising nodes and edges, wherein each of the plurality of software applications in the production environment is represented as one of the nodes in the dependency graph and wherein the edges connect the nodes to indicate dependencies between the plurality of software applications;

retrieving, by the processor, historical incident data related to a plurality of past production environment disruptions;

structuring, by the processor, the historical incident data related to the plurality of past production environment disruptions to generate structured historical incident data, the structured historical incident data comprising, for each of the plurality of past production environment disruptions, a root cause and a set of affected software applications of the plurality of software applications;

parsing, by the processor, the structured historical incident data to extract a set of attributes of at least one historical incident, the set of attributes comprising the root cause, one or more source software applications of the set of affected software applications, one or more impacted downstream software applications of the set of affected software applications, and a tier of each of the set of affected software applications; and generating, by the processor and using a plurality of neural networks that each correspond to one of the nodes in the dependency graph, weights for the nodes of the dependency graph, wherein each of the plurality of neural networks outputs the weight for the corresponding node based on the set of attributes;

receiving, by the processor, an update implemented in the production environment;

generating, by the processor, a severity score of the update implemented in the production environment by utilizing at least the weights of the weighted dependency graph; and based on determining, by the processor, that the severity score is above a threshold, performing, by the processor, a remediation action within the production environment to reverse the update implemented in the production environment.

13. The non-transitory computer-readable medium of claim 12, the method further comprising:

receiving, by the processor, additional incident data related to an additional production environment disruption;

recalculating, by the processor, weights for the nodes or edges of the weighted dependency graph based on the additional incident data; and updating, by the processor, the weights of the weighted dependency graph with the recalculated weights.

* * * * *